United States Patent Office 2,711,874
Patented June 28, 1955

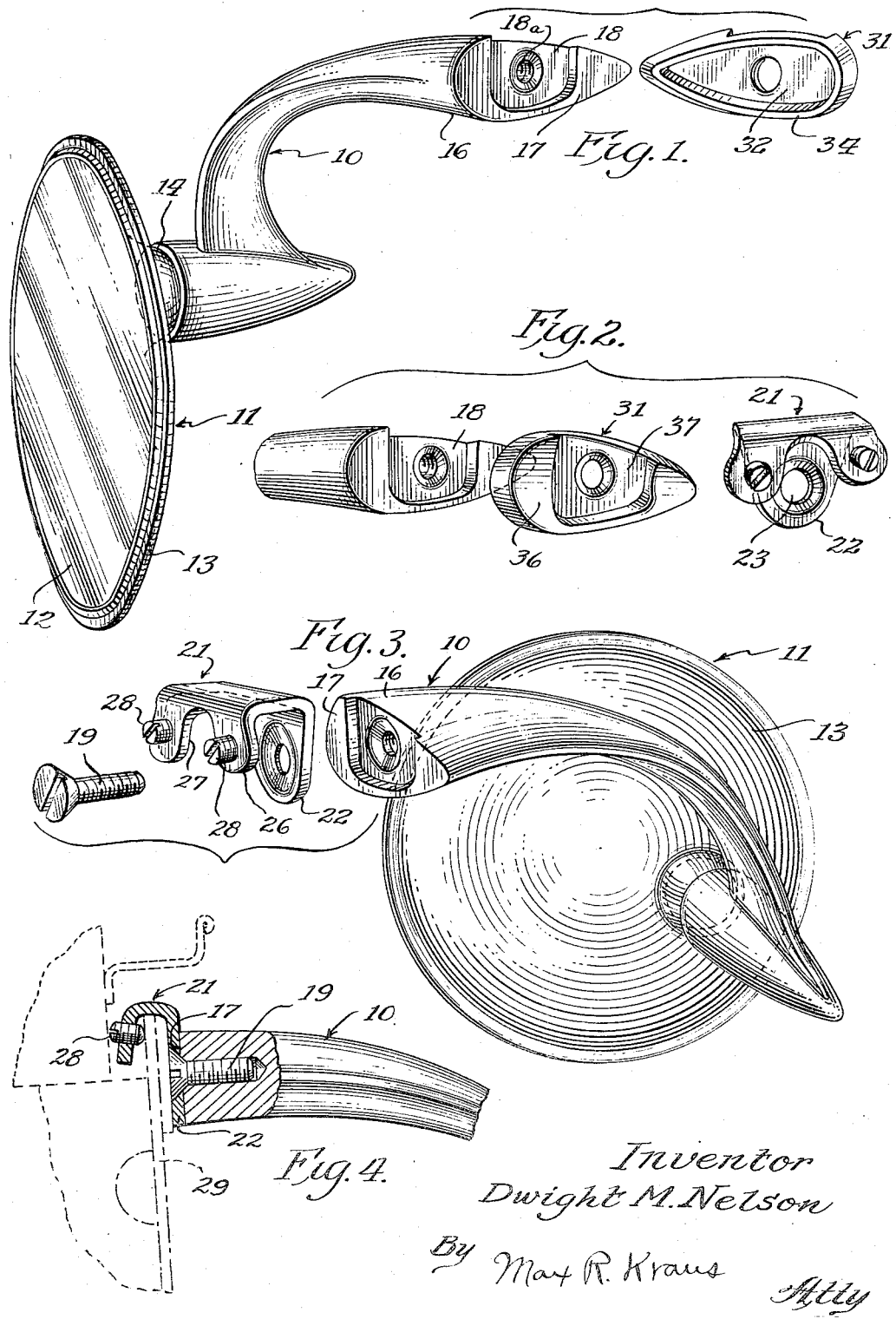

2,711,874

REAR VIEW MIRROR ASSEMBLY

Dwight M. Nelson, Chicago, Ill.

Application December 31, 1949, Serial No. 136,309

1 Claim. (Cl. 248—226)

My invention relates to a rear view mirror for motor vehicles and, more particularly, to improved means for mounting a rear view mirror on the door of an automotive vehicle.

Some of the more recent modeled automobiles incorporate various body designs in which the doors are variously shaped, some having the areas adjacent the upper flanges thereof substantially flat while others have a rounded contour. Thus, for each type of door construction separate mounting means had to be provided in order that satisfactory attachment of a rear view mirror to the door could be effected. This required the provision of at least two types of rear view mirror assemblies, each having a different mounting particularly adapted for use on one type of door construction. Accordingly, a dealer was required to carry in stock two such types of rear view mirrors, each adapted for a particular application which of course necessitated investing in a large inventory, in addition to tieing up additional display or storage space.

Accordingly, it is an object of my invention to provide a rear view mirror incorporating in a single construction mounting means universally adaptable for clamping on to automobile doors having flat or rounded contour surfaces.

Another object of my invention is the provision of a rear view mirror assembly which may be easily attached without the necessity of having additional apertures or making other alterations in the vehicle body and which when installed is attractive in appearance and harmonious with the vehicle body design.

Other and further objects and advantages of my invention will become apparent from the following description when considered in connection with the accompanying drawings in which:

Fig. 1 is an exploded perspective view illustrating a rear view mirror in accordance with my invention.

Fig. 2 is a similar view showing one combination of elements.

Fig. 3 is an exploded rear perspective view showing another combination of elements.

Fig. 4 is a fragmentary cross sectional view, partly in section, showing one manner in which my invention may be mounted on the door of a vehicle.

Referring to the drawings wherein is shown a preferred embodiment of my invention, the numeral 10 indicates an arm to the outer end of which is attached a suitable mirror head 11 comprising a silvered glass 12 enclosed within and retained by a metallic backing 13. The backing 13 is connected to the outer end of the arm 10 by ball and socket means 14 so that the position of the reflecting surface of the mirror head is rendered adjustable.

The arm 10 is preferably shaped as shown and the inner end 16 is progressively enlarged to provide a face 17 which is flat and which has a bearing area sufficiently large to effect rigid securement to the door of a vehicle when the arm 10 is applied thereto. A recess 18 is formed in the face 16 substantially centrally thereof, the said recess being provided with a tapped hole 18a to receive a screw 19.

A clamping member, indicated generally by the numeral 21, is substantially U-shaped and is formed with a leg 22 perforated, as at 23, to accommodate the screw 19, the said leg being adapted to be received in the recess 18 and retained therein by the said screw. The depth of the recess 18 is slightly greater than the thickness of the leg 22 so that the leg is disposed below the plane of the face 17 and only the bearing portions thereof actually engage the surface of a vehicle door. The opposite leg 26 of the clamping member 21 is notched medially thereof, as at 27, to provide clearance for accommodating the screw 19, and on either either side of the notch 27 the leg 26 is tapped to receive screws 28. As will be seen by reference to Fig. 4, the screws 28 are adapted to engage the flanged edge of a vehicle door 29 to secure the arm 10 thereto. Since the bearing portions of the face 17 are in a flat plane, it will be apparent that the said portions substantially completely engage the door flange which correspondingly is flat.

In the case of vehicles in which the doors thereof have a curved contour, I have provided an adaptor indicated by the numeral 31, for use with the mirror assembly hereinabove described. The said adaptor permits the use of the said assembly on vehicles having doors with curved contours. The adaptor 31, shown clearly in Figs. 1 and 2, consists of a forging or casting following substantially the form of the face 17, but on a somewhat enlarged scale. The outer face 32 of the adaptor is recessed leaving a raised peripheral edge 34 and providing a socket for the reception of the inner end of the arm 10. The opposite face 36 of the adaptor 31 is formed with a concave or cylindrically curved surface and also has a recess 37 shaped similarly to the recess 18. The leg 22 of the clamp member 21 is adapted to be received in the recess 37 when the parts are in assembled relation. The face 36 of the adaptor 31 conforms substantially to the contour of the vehicle body to which the mirror is intended to be attached. As will be apparent, the bearing areas of the face 36 are sufficiently large to engage a portion of the vehicle door to effect rigid securement of the mirror assembly thereto.

It will be apparent from the foregoing, that the adaptor 31 is intended to be included with each rear view mirror assembly, and if a user desires to use the mirror assembly on a vehicle door having a flat contour, the adaptor is not used. On the other hand, should a user desire to use the rear view mirror assembly on a vehicle having a rounded contour, at the point of attachment, the adaptor 31 is interposed between the face 17 and the leg 22 of the clamp member 21 and the said parts are secured in rigid relationship by the screw 19. The face 36 then serves as one leg of the clamp with the bearing areas thereof engaging the outer surface of the vehicle door. The leg 26 then is opposed to the inner surface of the door and the screws 28 engage the inner surface of the door to clamp the arm thereto.

I claim:

A mounting for a rear view mirror adapted to embrace a curved surface of a door flange, said mounting including an arm having a substantially oval shaped base portion which has a flat bearing surface and an intermediate recess therein which is open at the top thereof, a substantially oval shaped adaptor element substantially of the form of the base portion of the arm but larger, said adaptor element having an outer and inner face, said outer face having a recess therein with a peripheral edge forming a socket which receives the base portion and encompasses the flat bearing surface and the intermediate recess of said arm and prevents relative rotation therebetween, said inner face having a curved bearing surface and an intermediate recess therein open at the top thereof of substantially the shape of the first mentioned recess, a substantially U-shaped clamping member having inner and outer legs joined by a connecting section, said clamping member detachably secured to said adaptor and said arm with the outer leg thereof received within the recess in the inner face of said adaptor.

References Cited in the file of this patent

UNITED STATES PATENTS

| | | |
|---|---|---|
| 1,488,559 | Simokaitis | Apr. 1, 1924 |
| 2,212,033 | Morley | Aug. 20, 1940 |
| 2,238,877 | Anderson | Apr. 22, 1941 |
| 2,248,833 | Thibault et al. | July 8, 1941 |
| 2,259,179 | Sauer | Oct. 14, 1941 |
| 2,338,780 | Poncher et al. | Jan. 11, 1944 |
| 2,579,995 | Atchison | Dec. 25, 1951 |
| 2,600,893 | Mariani | June 17, 1952 |